United States Patent
Halmos

(10) Patent No.: US 7,505,488 B2
(45) Date of Patent: Mar. 17, 2009

(54) SYNTHETIC APERTURE LADAR WITH CHIRPED MODELOCKED WAVEFORM

(75) Inventor: Maurice J. Halmos, Encino, CA (US)

(73) Assignee: Raytheon Company, Waltham, MA (US)

(*) Notice: Subject to any disclaimer, the term of this patent is extended or adjusted under 35 U.S.C. 154(b) by 823 days.

(21) Appl. No.: 10/732,427

(22) Filed: Dec. 9, 2003

(65) Prior Publication Data
US 2004/0125835 A1 Jul. 1, 2004

(51) Int. Cl.
*H01S 3/098* (2006.01)
(52) U.S. Cl. .............................. 372/18; 372/26; 372/72; 372/92; 372/99
(58) Field of Classification Search .................. 372/18, 372/26, 92, 99, 72, 75, 15
See application file for complete search history.

(56) References Cited

U.S. PATENT DOCUMENTS

| | | | |
|---|---|---|---|
| 3,500,236 A | | 3/1970 | Clark |
| 3,534,289 A | | 10/1970 | Clark |
| 3,611,182 A | | 10/1971 | Treacy |
| 4,025,875 A | * | 5/1977 | Fletcher et al. ............... 372/30 |
| 4,314,210 A | * | 2/1982 | Everett ........................ 372/18 |
| 4,410,992 A | * | 10/1983 | Javan ......................... 372/32 |
| 4,662,741 A | * | 5/1987 | Duvall et al. ............... 356/5.09 |
| 4,666,295 A | | 5/1987 | Duvall, III |
| 5,054,027 A | * | 10/1991 | Goodberlet et al. ........... 372/25 |
| 5,835,199 A | * | 11/1998 | Phillips et al. ............. 356/5.03 |
| 5,867,304 A | * | 2/1999 | Galvanauskas et al. ..... 359/333 |

(Continued)

FOREIGN PATENT DOCUMENTS

DE 40 42 440 7/1992

(Continued)

OTHER PUBLICATIONS

Christian Spielmann, et. al. "Experimental Study of Additive-Pulse Mode Locking in an Nd:Glass Laser" IEEE Journal of Quantum Electronics, vol. 27, No. 5, May 1991, pp. 1207-1213.*

(Continued)

*Primary Examiner*—Minsun Harvey
*Assistant Examiner*—Delma R Forde
(74) *Attorney, Agent, or Firm*—Leonard A. Alkov

(57) ABSTRACT

The present invention uses an intra-cavity modulation approach to modulate a laser transmitter at bandwidths greater than a few gigahertz (GHz) in a non-ambiguous waveform by chirping the laser and simultaneously mode locking. Accordingly, the inventive system includes a source of a beam of electromagnetic energy; a mechanism for mode locking the beam; and an arrangement for chirping the beam. In the illustrative embodiment, the source is a laser. The mode locking mechanism may be an active element or a passive element. The beam is chirped with a translation mirror. The translation mirror may be driven with a piezo-electric drive coupled. In the best mode, the carrier is chirped with an electro-optical crystal disposed in the cavity of the laser. The laser is chirped to the free-spectral range limit, which is typically a few hundred megahertz, by scanning the optical length of the laser resonator. After simultaneously mode locking, the waveform created is a train of mode locked pulses that have an optical carrier frequency chirped in time.

2 Claims, 4 Drawing Sheets

U.S. PATENT DOCUMENTS

| | | | |
|---|---|---|---|
| 6,333,966 B1 * | 12/2001 | Schoen | 378/119 |
| 6,559,932 B1 * | 5/2003 | Halmos | 356/5.03 |
| 6,590,910 B2 * | 7/2003 | Lin | 372/18 |
| 6,693,928 B2 * | 2/2004 | May | 372/19 |
| 2002/0018494 A1 * | 2/2002 | Vieira et al. | 372/9 |

FOREIGN PATENT DOCUMENTS

| | | |
|---|---|---|
| DE | 42 42 862 | 6/1994 |
| JP | 05 211363 | 12/1993 |
| WO | WO 03/038465 | 5/2003 |

OTHER PUBLICATIONS

M. J. Halmos, D. M. Henderson and R. L. Duvall III, "Pulse Compression of an FM Chirped CO2", Applied Optics, vol. 28, No. 17, Sep. 1989.

Halmos, M.J. et al: "Pulse Compression of an FM Chirped CO2 Laser" Sep. 1, 1989, Applied Optics, Optical Society of America. Washington, US, pp. 3595-3602, XP000048299, ISSN: 0003-6935.

* cited by examiner

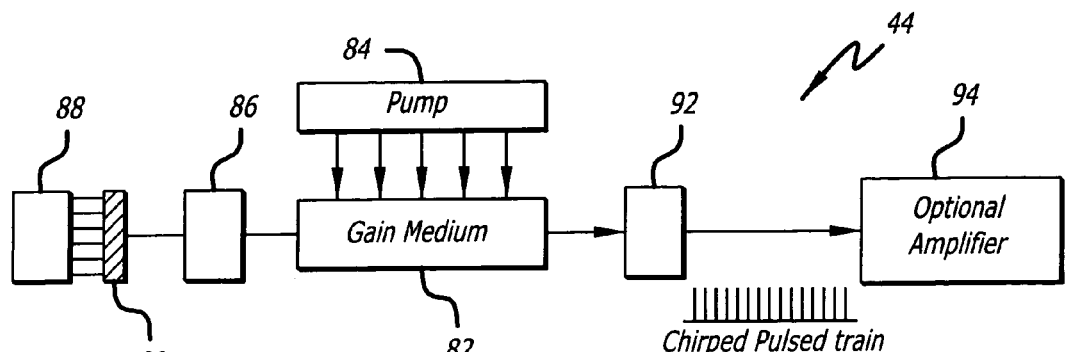
FIG. 4
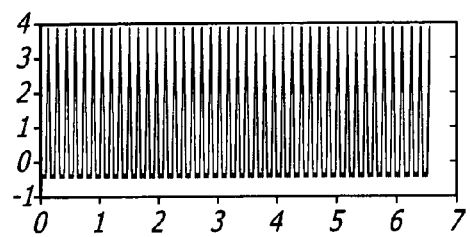
FIG. 5a
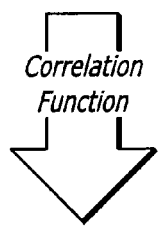
Correlation Function
FIG. 5b
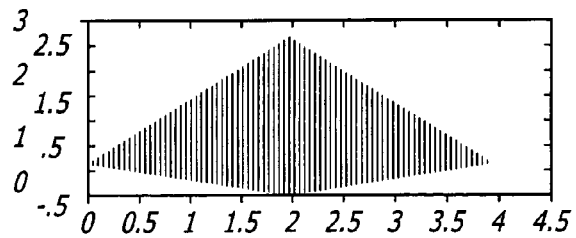
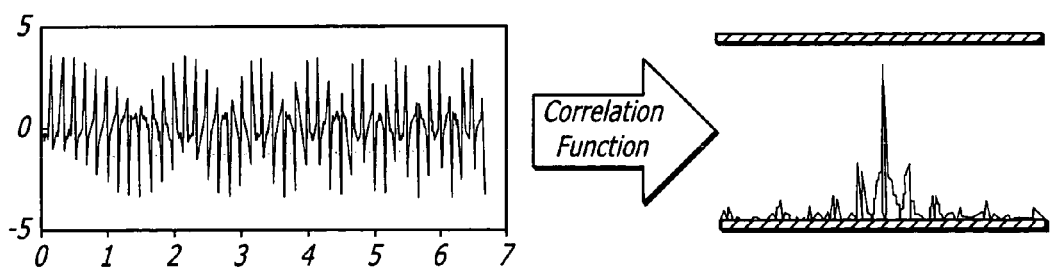
FIG. 6a    FIG. 6b

SYNTHETIC APERTURE LADAR WITH CHIRPED MODELOCKED WAVEFORM

BACKGROUND OF THE INVENTION

1. Field of the Invention

This invention relates to laser radar systems (ladars). Specifically, the present invention relates to synthetic aperture ladar systems.

2. Description of the Related Art

Long range imaging or mapping has become of great interest for both defense and commercial applications. In defense applications, high-resolution target imaging allows for target identification at safe ranges beyond weapon capabilities. For defense and commercial applications, there is a need to perform terrain mapping for high-resolution topography.

High resolution imaging at long ranges is becoming a commercial priority as well. High resolution imaging will allow high flying aircraft to determine the content of open bay trucks, or whether people are carrying weapons or tools. Other applications such as NASA's desire to map possible landing sites for unmanned crafts, drive resolution requirements to just a couple of inches at ranges greater than 100 km.

High resolution long range imaging would also be useful for numerous additional applications including Homeland Security and terrain surveillance.

Passive optical (infrared) approaches have been used in the past for this application as well as synthetic aperture radar (SAR). Infrared approaches are limited by the physical aperture size of the optics.

Conventional SAR with its associated long wavelength cannot achieve the desired high resolutions. Also, the time required to span the much larger synthetic aperture needed for high resolution make it impossible to image targets that have any motion.

U.S. patent application Ser. No. 10/020,730 filed Oct. 30, 2001 by M. J. Halmos entitled SYNTHETIC APERTURE LADAR SYSTEM USING INCOHERENT LASER PULSES, the teachings of which are hereby incorporated herein by reference, discusses the use of a uniformed spaced set of pulses from a mode locked laser and also the use of an incoherent single pulse waveform.

Unfortunately, in certain applications, where the target range is very long, a single pulse is not practical due to the large amount of energy required. These energies could cause optical damage. The solution would be to spread the energy into multiple pulses as with the mode lock waveform. However, a drawback of this waveform, is that the repeating pulses may cause an inherent range ambiguity due to the repeating nature of the pulses. A third approach commonly used in synthetic aperture radar is to use the Linear FM chirped waveform. However, this waveform is difficult to obtain due to the high time-bandwidth products required and the lack of high bandwidth optical modulators. Also, one would like to modulate a laser intra-cavity where a linear phase change is augmented with a linear frequency chirp. However, the maximum chirp that one can practically get is limited by the laser mode spacing $c/(2L)$ (c=speed of light and L is the resonator optical length).

Hence, there is a need in the art for an improved system or method for long range, high resolution imaging.

SUMMARY OF THE INVENTION

In order to obtain the required down-range resolution, the laser transmitter must, in some cases, be modulated at bandwidths greater than a few gigahertz (GHz) in a non-ambiguous waveform. The present invention uses an intra-cavity modulation approach that divides the task into two sub-tasks: 1) chirping the laser and 2) simultaneously mode locking. Accordingly, the inventive system includes a source of a beam of electro-magnetic energy; a mechanism for mode locking the beam; and an arrangement for chirping the beam.

In the illustrative embodiment, the source is a laser. The mode locking mechanism may be an active element or a passive element. The beam is chirped with a translation mirror. The translation mirror may be driven with a piezo-electric drive coupled. In the best mode, the carrier is chirped with an electro-optical crystal disposed in the cavity of the laser. The laser is chirped to the free-spectral range limit, which is typically a few hundred megahertz (MHz), by scanning the optical length of the laser resonator. After simultaneously mode locking, the waveform created is a train of mode locked pulses that have an optical carrier frequency chirped in time. Adding the chirped component mitigates the occasional problem of range ambiguities when absolute range mapping is desired.

BRIEF DESCRIPTION OF THE DRAWINGS

FIG. 4 shows a block diagram of a laser designed to output a train of chirped mode locked pulses using mirror position modulation in accordance with an illustrative embodiment of the teachings of the present invention.

FIG. 5(a) and FIG. 5(b) show a correlation function of a train of mode locked pulses.

FIG. 6(a) and FIG. 6(b) show a correlation function of a train of mode locked pulses chirped in accordance with the teachings of the present invention.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
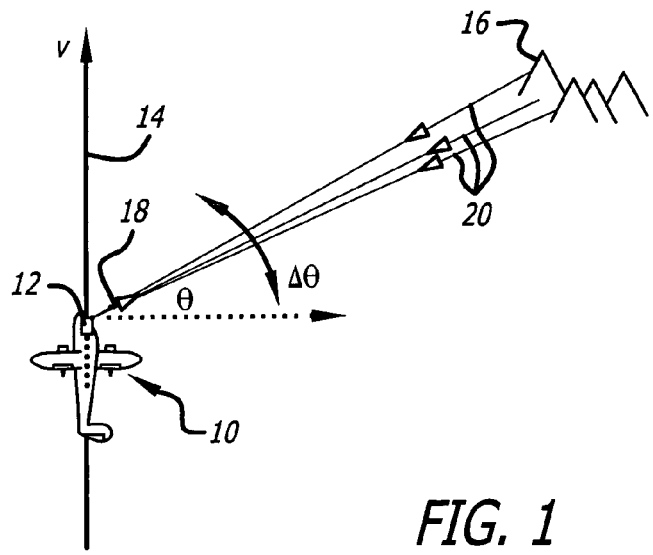
FIG. 1 is a diagram showing an aircraft employing a ladar system constructed in accordance with the teachings of the present invention and illustrating general ladar principles of operation.

FIG. 1 is a diagram showing an aircraft 10 employing a ladar system 12 constructed in accordance with the teachings of the present invention and illustrating general ladar principles of operation. The aircraft 10 has a velocity vector (V) 14 as it flies by a terrain 16. The ladar system 12 is mounted on the front of the aircraft 10 and transmits a laser beam 18 toward terrain 16 or another target (not shown).

In the present embodiment, the transmitted laser beam 18 is a high-energy eye-safe Q-switched pulsed laser beam comprising a sequence of high-energy pulses. The Q-switched pulsed laser beam 18 reflects from the terrain 16, producing three laser returns 20 from three different surfaces of the terrain 16 for each pulse of the laser beam 18. By measuring the time between transmission of a given pulse and the detection of the corresponding laser returns by the radar system 12, the distance to the terrain 16 and its various surfaces is determined.

As the aircraft 10 passes over or by the terrain 16, it fires the laser 18 for a predetermined time, called the dwell time or the measuring time ($T_{meas}$). Throughout the measuring time T, the angle ($\theta$) at which the transmitted laser beam 18 and the returns 20 strike and reflect from the terrain 16 changes ($\Delta\theta$). As the angle $\theta$ changes, each surface of the terrain 16 yields a return at a slightly different frequency than returns from the other surfaces due to Doppler frequency shifts in the returns from the radial motion of the aircraft 10 relative to the terrain 16. The Doppler frequency shifts depend on the angle at which the transmitted laser beam 18 strikes the different surfaces of the terrain 16.

Each return pulse 20 effectively samples the Doppler tones that are present due to the radial motion of the aircraft 10 relative to the terrain 16. Each return pulse is sampled several times (N times), with each sample being stored in a range bin corresponding to the time at which the sample was taken. The time at which the sample was taken represents the distance or range corresponding to the sample. Over the measuring time $T_{meas}$, several return pulses are sampled by a high-speed A/D converter, as discussed more fully below. After all the samples have been taken, the phase and frequency correction process may be performed. The sampled data in N range bins and M pulses is output to Discrete Fourier Transform (DFT) modules. The DFT modules extract data from the individual range bins to compute frequency spectrum associated with each range bin. The frequency spectrum represents cross-range information, which indicates the relative angular position associated with the sampled data from each range bin. Consequently, the angular position associated with each range bin yields range and cross-range information for each surface of the terrain 16. This range and cross-range information may then be plotted to yield an accurate profile of the terrain 16 in the direction of travel 14 of the aircraft 12.

The measuring time ($T_{meas}$) multiplied by the velocity (V) of the aircraft is proportional to the synthetic aperture, which is inversely proportional to the cross-range resolution of the ladar system 12. Generally, the Doppler frequency shift (Doppler velocity) ($f_d$) associated with a return 20 due the motion of the aircraft 10 relative to the terrain 16 for a small angle $\theta$ is given by the following equation:

$$f_d = \frac{2V}{\lambda} \cdot \sin(\theta) \cong \frac{2V}{\lambda} \cdot \theta, \quad [1]$$

where $\lambda$ is the wavelength of the transmitted laser beam 18, and V is the velocity of the aircraft 10.

The angle $\theta$ corresponding to the Doppler shift $f_d$ is given by the following equation, which is obtained by rearranging equation (1):

$$\theta = \frac{\lambda f_d}{2V} \Rightarrow \delta\theta = \frac{\lambda \cdot \delta f_d}{2V}, \quad [2]$$

where $\delta\theta$ is a small change in angle $\theta$ and represents the cross-range resolution, while $\delta f_d$ is a corresponding small change in the Doppler shift $f_d$ and corresponds to the accuracy with which the Doppler $f_d$ shift can be measured.

The best frequency resolution given by the following equation, which is obtained from Fourier theory:

$$\delta f_d \approx \frac{1}{T_{meas}}, \quad [3]$$

where $T_{meas}$ is the measuring time or dwell window during which scene measurements are performed by the ladar system 12.

The cross-range resolution $\delta\theta$, also called the resultant Field Of View (FOV) is given by the following equation:

$$\delta\theta = \frac{\lambda}{2V \cdot T_{meas}} = \frac{\lambda}{2 \cdot D_{synth}}, \quad [4]$$

where $D_{synth} = VT_{meas}$, which is the synthetic aperture size.

Using the synthetic aperture approach, one could use a relatively small physical aperture and set the measuring time $T_{meas}$ such that $2VT_{meas}=75$ cm. In coherent ladar systems, $T_{meas}$ represents the time during which the transmitted laser must remain coherent. The ladar system 12 of the present invention does not require that the transmitted laser beam 18 be coherent.

For a typical cross-range resolution of 20 cm (required for long-range high-resolution topography) operating 100 km from scene 16 at an eye-safe laser wavelength of $1.5 \times 10^{-6}$ m, from a plane flying at 200 m/s, the measuring time $T_{meas}$ is approximately 1.875 milliseconds. The bandwidth required for the line of sight resolution is approximately 300 MHz. The figure of merit, the bandwidth-time product, BT, of laser beam 18 is approximately 560,000.

Figure 2:
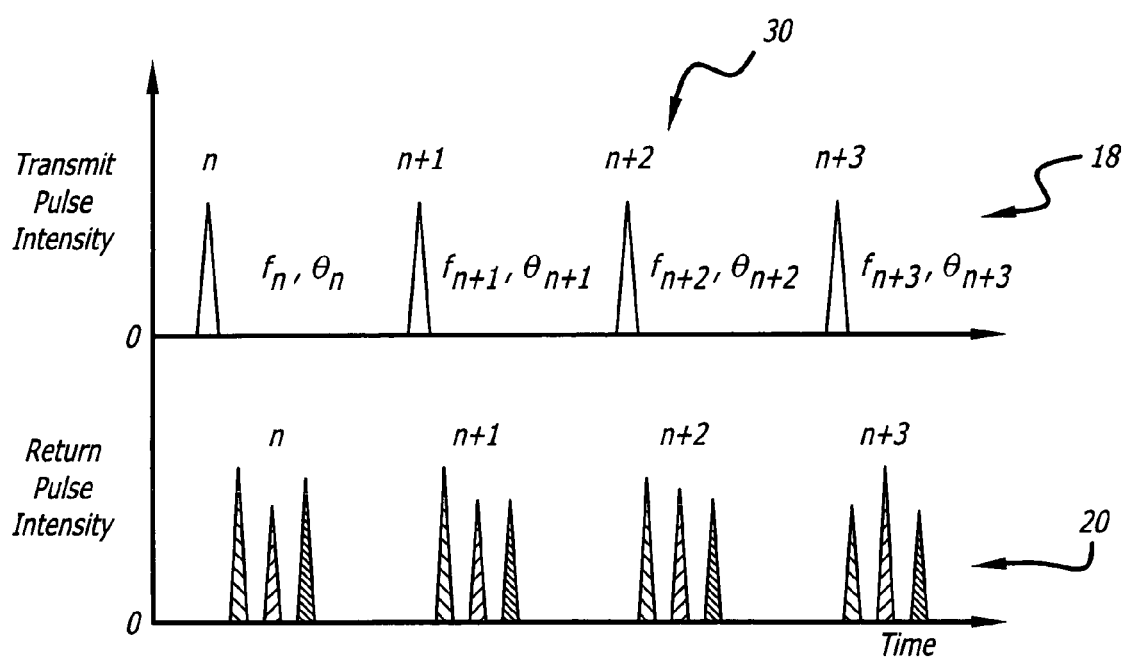
FIG. 2 is a graph showing an exemplary ladar pulse train transmitted by the ladar system of FIG. 1 and a received pulse train after reflection off three different surfaces.

FIG. 2 is a graph 30 showing an exemplary Q-switched laser pulse train 18 transmitted by the ladar system 12 of FIG. 1 and a received pulse train 20 detected by the ladar system 12 after reflection off three different surfaces of the terrain 16 of FIG. 1. The graph 30 is shows pulse intensity versus time.

Each pulse (n→n+3) of the transmitted pulse train 18 yields, a short time later, a corresponding set of three returns in the received pulse train 20, one return for each surface reflected by the terrain 16 of FIG. 1. For illustrative purposes, the return pulse train 20 has three distinct returns for each transmitted pulse of the pulse train 18. In practice, each set of three returns in the pulse train 20 are typically closer together and may blend into a single return pulse, with different peaks, each peak corresponding to a surface of the terrain 16.

The transmitted pulse train 18 is incoherent from pulse to pulse, and consequently has a random phase and random frequency offsets. Each pulse of the transmitted pulse train 32 is associated with a frequency offset ($f_n$) and random phase ($\theta_n$). The ladar system 12 of FIG. 1 measures the frequency offsets $f_n$ and phases $\theta_n$ of the outgoing noncoherent pulse train 18 to compensate the return pulse train 20 for frequency offset $f_n$ and phases $\theta_n$, as discussed more fully below.

Figure 3A:
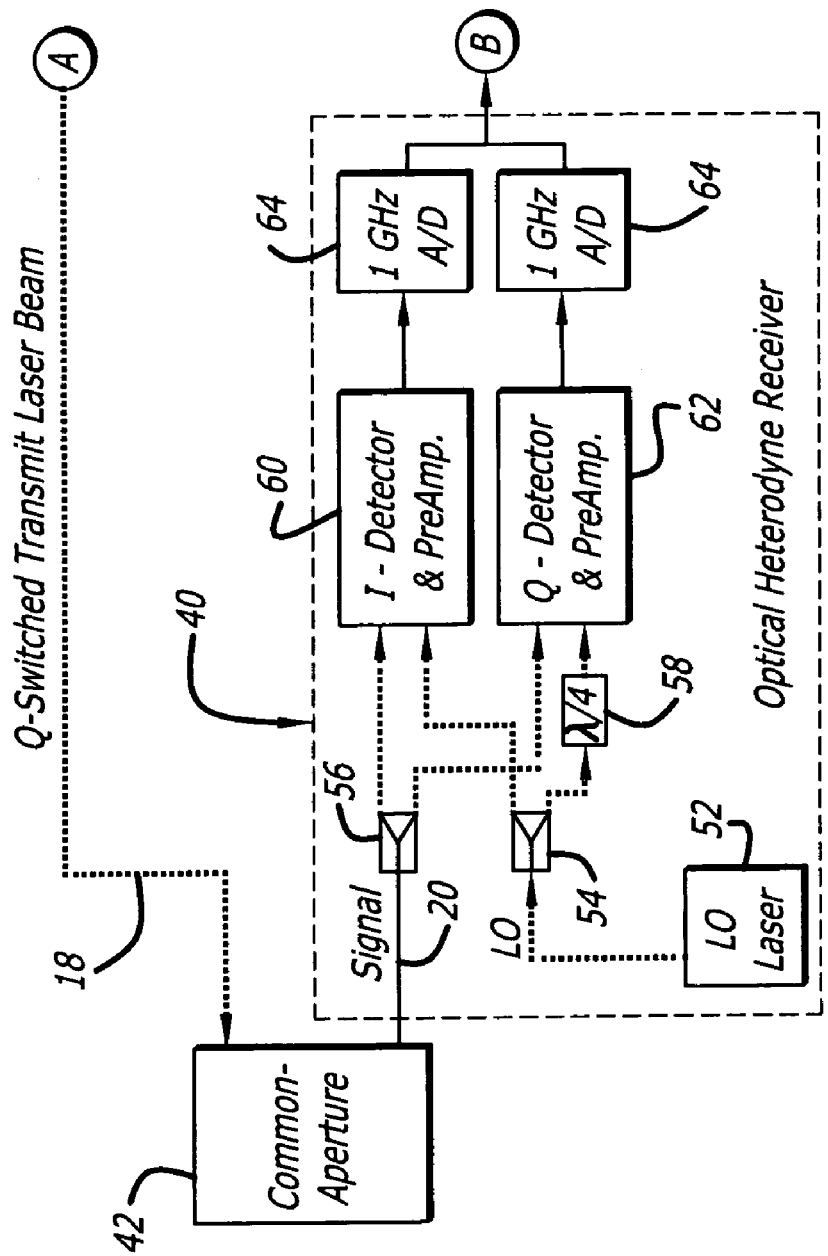
FIG. 3(a) and FIG. 3(b) are more detailed diagrams of the ladar system of FIG. 1 employing an In-phase (I) and Quadrature (Q) laser detector.
Figure 3B:
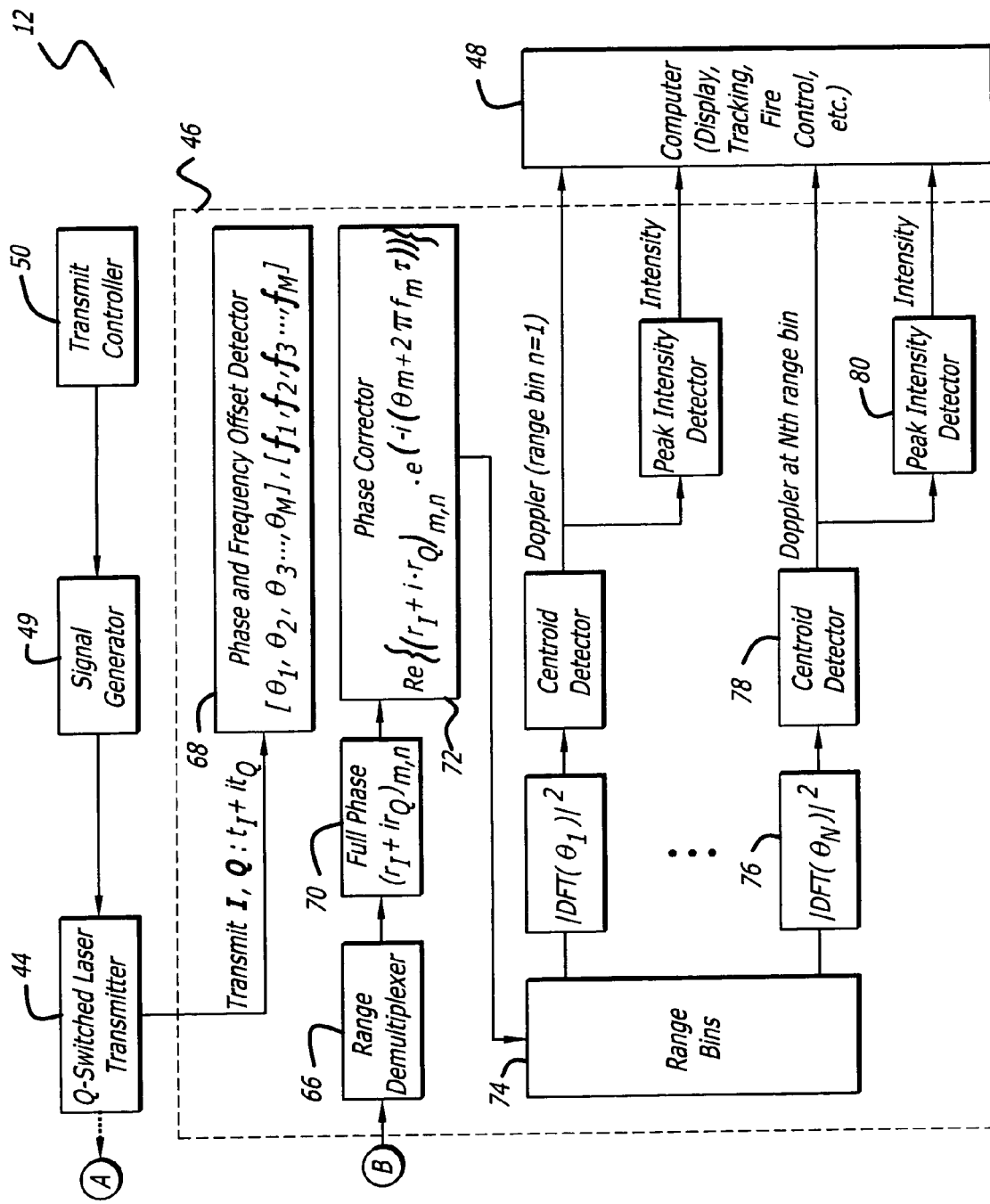

FIG. 3(a) and FIG. 3(b) are more detailed diagrams of the ladar system 12 of FIG. 1 employing an In-phase (I) and Quadrature (Q) laser receiver 40, which is an optical heterodyne detector. For clarity, various well-known components, such as power sources, signal amplifiers, noise filters, and focusing optics have been omitted from FIG. 3(a) and FIG. 3(b), however those skilled in the art with access to the present teachings will know which components to implement and how to implement them to meet the needs of a given application.

The ladar system 12 includes a common aperture 42, which communicates with a Q-switched laser transmitter 44 and the optical heterodyne receiver detector 40. The transmitter 44 and the heterodyne receiver 40 communicate with a synthetic aperture processor 46, which communicates with a computer 48, such as a display, target tracking, or fire control computer. The Q-switched transmitter 44 receives input from a signal generator 48, which receives input from a transmit controller 50.

In the present embodiment, the ladar system 12 is a monostatic ladar system since the transmitter 44 and the receiver 40 share the common aperture 42. The Q-switched transmitter 44 includes a transmit laser that may be implemented as an Er:Yb:Glass Q-switched laser or an Er:Yb:YAG high-power laser. Those skilled in the art will appreciate that the ladar system 12 may be another type of ladar system, such as a bistatic ladar system employing a different type of transmit laser, without departing from the scope of the present invention.

In operation, the transmit controller 50 provides control signals to the signal generator 48 which specify waveform details, such as pulse width, energy per pulse, pulse spacing, and so on. The signal generator 48 generates an electrical signal according to the waveform details. The electrical signal drives the Q-switched laser transmitter 44, which produces a Q-switched laser beam 18 characterized by the waveform details. The Q-switched laser transmitter 44 determines I and Q components of the Q-switched transmitted laser beam 18 before transmission from the ladar system 12. The I and Q components of the outgoing Q-switched laser beam 18 are determined, similarly to the optical heterodyne receiver 40, as discussed more fully below. The I and Q components of the outgoing Q-switched laser beam 18 are input to a phase and frequency offset detector 68 of the synthetic aperture processor 46. The transmit controller 50 and/or the signal generator 48 may be implemented via software running on the synthetic aperture processor 46 without departing from the scope of the present invention.

The transmitted laser beam 18 reflects from the scene, such as the terrain 16 of FIG. 1, yielding the laser return signal 20, which is detected by the optical heterodyne receiver 40. The optical heterodyne receiver 40 includes a local oscillator laser 52, a first beam splitter arrangement 54, a second beam splitter arrangement 56, a quarter-wave retarder 58, an in-phase (I) optical detector 60, a quadrature (Q) optical detector 62, and a high speed (typically 1 GHz or greater) analog-to-digital converters 64.

In operation, the local oscillator 52 transmits a coherent Continuous Wave (CW) reference laser beam, in the form of a sine wave, to the first beam splitter arrangement 54. The first beam splitter arrangement 54 transmits the local oscillator reference signal to the I-detector 60 and the quarter-wave retarder 58. The quarter-wave retarder 58 converts the input sine wave into a laser beam having a cosine waveform and transmits the cosine waveform to the surface of the Q-detector 62. Similarly, the first beam splitter arrangement 56 splits the laser return beam 20 received from the common aperture 42 into two sinusoidal beams. The two sinusoidal beams strike the I-detector 60 and the Q-detector 62 coincident with the beams output by the first beam splitter arrangement 54 and the quarter-wave optical retarder 58, respectively.

The I-detector 60 and the Q-detector 62 detect beat frequencies, called Doppler tones, corresponding to I and Q received signal components, respectively. The I-detector 60 and the Q-detector 62 convert respective the I and Q received signal components into corresponding analog I and Q electrical signals. The I and Q analog electrical signals are then sampled at 1 GHz via Analog-to-Digital (A/D) converters 64. In the illustrative implementation, the A/D converters output a 1 GHz digital received signal having I and Q components. The 1 GHz digital received signal is then input to a range demultiplexer 66 implemented in the synthetic aperture processor 46.

The synthetic aperture processor 46 includes the range demultiplexer 66, which provides input to a full phase circuit 70. The full phase circuit 70 provides input to a phase corrector 72. The phase corrector 72 also receives input from the phase and frequency offset detector 68 from the M transmitted pulses. The phase corrector 72 provides output to a set of N range bins 74 and M pulses per range bin. Each $n^{th}$ range bin of the N range bins 74 provides output to N corresponding Discrete Fourier Transform (DFT) circuits 76. The N DFT modules 76 provide input to N corresponding centroid detectors 78. The N centroid detectors 78 provide Doppler information to the computer 48 and to N corresponding peak intensity detectors 80. The peak intensity detectors 80 provide intensity input to the computer 48.

In operation, the various modules 66-80 of the synthetic aperture processor 46 are implemented in software. The synthetic aperture processor 46 may be implemented by the computer 48 without departing from the scope of the present invention.

The A/D converters 64 sample the analog signals output from the I-detector 60 and the Q-detector 62 at predetermined intervals based on a priori knowledge of the pulse spacing of the transmitted laser beam 18. The A/D converters 64 may be preset with pulse spacing information or may obtain the pulse spacing information via a connection (not shown) to the Q-switched laser transmitter 44. The intervals at which the A/D converters 64 sample the received signal coincide with pulses the received analog I and Q signal output from the detectors 60 and 62. The A/D converters take N samples per pulse. The number of samples N taken per pulse depends on the pulse width of the transmitted laser 18 and the sampling rate (1 GHz) of the A/D converters 64 and the range window that is desired. In the illustrative embodiment, the sampling rate is approximately three nanoseconds. The exact pulse width, intensity, frequency, and other waveform characteristics of the transmitted laser beam 18 are application-specific and may be determined by one skilled in the art to meet the needs of a given application.

Each of the N digital I and Q samples output by the A/D converters 64 per pulse are demultiplexed onto a single path by the range demultiplexer 66 and input to the full phase circuit 70. The full phase circuit 70 expresses the sampled demultiplexed I and Q signal output from the range demultiplexer 66 in imaginary form, $r_I + ir_Q$, where $r_I$ is the in-phase component of the received signal and $ir_Q$ is the imaginary component. Expressing the return signal in this form ($r_I + ir_Q$) facilitates phase correction by the phase corrector 72.

Frequency and phase information about the transmitted laser beam 18 is provided to the phase and frequency offset detector 68. I and Q components, $t_I$ and $it_Q$, respectively, of the transmitted laser beam 18 are forwarded to the phase and frequency offset detector 68 by the Q-switched laser transmitter 44. The Q-switched laser transmitter 44 determines the I and Q components of the transmitted laser beam 18 similar to the way the optical heterodyne receiver 40 determines I and Q components of the received signal 20. The phase and frequency offset detector 68 extracts frequency and phase information ($[\theta_1, \theta_2, \theta_3, \ldots, \theta_M]$, $[f_1, f_2, f_3, \ldots, f_M]$) from the transmit signal ($t_I+it_Q$) via methods known in the art. The phase and frequency information includes measured phase offsets and frequency offsets that occur from one Q-switched pulse to the next.

The relative phase $\theta_n$ of each transmitted pulse of the transmitted beam 18 is detected and recorded by the Phase and Frequency Offset Detector of the ladar system 12. A measured phase array ($[\theta_1, \theta_2, \theta_3, \ldots, \theta_M]$) and a frequency offset (frequency hop) array ($[f_1, f_2, f_3, \ldots, f_M]$) computed by the phase and frequency offset detector 68 are used to correct the received signal in preparation for a subsequent Fourier transform operation, as discussed more fully below.

In this mode, the pulses of the received signal are not necessarily evenly spaced. However, the reference beam output by the local oscillator 52 is coherent throughout the measuring time $T_{meas}$. The local oscillator 52 may be implemented with a standard laser usually of the same base material as the transmitter, such as Er:Yb:Glass or Er:YAG in the current embodiment. As is known in the art, the coherence of the local oscillator 52, which is relatively low-power and runs in CW mode, is easier to maintain than a high energy pulsed transmit laser, such as the Q-switched laser transmitter 44.

After the I and Q received signals are obtained via the optical heterodyne receiver 40, they are digitized by the A/D converters 64. To reduce computational requirements, the range demultiplexer 66 performs range demultiplexing. The range demultiplexer 66 adjusts the input bit stream so that the subsequent phase correction is only performed at range bins associated with expected returns. After the received signal $r_n$ for a range bin n is collected, the phase corrector 72 corrects it.

The phase corrector 72 employs the phase and frequency information ($[\theta_1, \theta_2, \theta_3, \ldots, \theta_M], [f_1, f_2, f_3, \ldots, f_M]$) of all M pulses, to apply a phase correction term ($e^{(-i(\theta_m + 2\pi f_m \tau))}$) to the received signal $r_I + ir_Q$. The phase corrector 72 then outputs a corrected signal at range bin n ($S_n$) given by the following equation:

$$S_n = Re\{(r_I + i \cdot r_Q)_{n,m} \cdot e^{(-i(\theta_m + 2\pi f_m \tau))}\}, \quad [5]$$

where $(r_I + ir_Q)_{n,m}$ represents a portion of digital received signal associated with an $n^{th}$ range bin and the $m^{th}$ pulse, and having an in-phase component $r_I$ and a quadrature component $r_Q$; $\theta_m$ represents a phase correction term associated with the $m^{th}$ pulse; $f_n$ represents a frequency correction term associated with the $m^{th}$ pulse and $\tau$ is a digital time running variable.

The phase-corrected signal $S_n$ is then clocked into the range bins 74, which may be implemented via a software register. After the N range bins have been filled by $S_1$ through $S_N$, which represents the portion of the received signal corresponding to a single set of returns, the range bins 74 are cleared in parallel as the contents of the range bins 74 are clocked into the N corresponding DFT modules 76. The DFT modules 76 compute the square of the magnitude of the DFT of the signal corresponding to each range bin. For example, the DFT operation for the signal in the first range bin $S_1(m)$, where m is an integral time variable, involves accumulating $S_1(m)$ according to the following equation:

$$|DFT_1(\omega)|^2 = \left|\sum_{m=0}^{M-1} S_1(m) e^{-j\omega m}\right|^2, \quad [6]$$

where M is the number of samples taken during the measuring time $T_{meas}$; $\omega = 2\pi k/L$, $k = 0, 1, 2, \ldots, M-1$; $S_1(m) = 0$ for $0 > m > M$. $DFT_1(\omega)$ represents the frequency response associated with the first range bin of the range bins 76. The magnitude squared of $DFT_n(\omega)$ will preferably have one or more peaks at the frequency corresponding to the Doppler tone associated with the $n^{th}$ range bin as discussed more fully below. This frequency peak represents cross-range information associated with the $n^{th}$ range bin.

The DFT modules 76 compute the $DFT_1(\omega)$ via Fast Fourier Transform (FFT) algorithms, which are well known in the art. The DFT modules 76 output frequency responses (spectrums) to the corresponding centroid detectors 78. The centroid detectors 78 compute the centroids of the frequency responses, via methods known in the art, yielding center frequencies. The center frequencies output by the centroid detectors 78 represent cross-range information in the form of Doppler frequencies. This cross-range information is input to the computer 48. The computer 48 may then generate a range versus cross-range plot based on the cross-range information and the range information. The range information is indicated by the number of the range bin associated with cross-range information output by each centroid detector 78. Furthermore, the cross-range information from the centroid detectors 78 is input to corresponding peak intensity detectors 80. The peak intensity detectors 80 compute intensity information corresponding to the magnitudes of the peaks of the centroids and not just the frequency locations of the centroids. The intensity information corresponding to each range bin is also input to the computer 48.

The computer 48 may include a display, tracking software, fire control software, chemical analysis software, and so on. In the illustrative embodiment, the computer 48 runs software for displaying a cross-range versus range plot, which is indicative of a profile of the scene, such as the terrain 16 of FIG. 1 being imaged.

When mapping either the ground or a target at long ranges, the line of sight resolution is obtained by using a high bandwidth signal, such as a short pulse or train of pulses, but the cross-range resolution is usually limited by the detector pixel field of view (FOV). The best theoretical angular pixel resolution is given the simple relation:

$$FOV = \lambda/D_r \quad [7]$$

where $\lambda$ is the optical signal wavelength and $D_r$ is the receiver aperture. The typical cross resolution required for the mentioned application is approximately 20 cm or less. If a laser transmitter 44 is used in the eye-safe region, the wavelength will be approximately $1.5 \times 10^{-6}$ m. To operate at a range of 100 km, for example, the aperture that would be required for the 20 cm, d, resolution will be:

$$D_r = \lambda R/d \quad [8]$$

where R is the range, yielding a diameter $D_r = 3/4$ meter.

Apertures and telescopes approaching meter diameter are very expensive, sensitive to thermal and gravitational distortions, and typically very heavy for medium size crafts to carry. A solution to this limitation is to apply the same technique used in the radar world where the problem is more severe due to the much longer wavelength, and that is to use synthetic aperture reception.

Using the synthetic approach, one could use a relatively small aperture, and still have a good resolution by having the measuring time, $T_{meas}$, long enough such that twice the aircraft velocity times the measuring time ($2 \cdot V \cdot T_{meas}$) yields a large enough effective (synthetic) aperture. In the illustrative embodiment, the measurement time would be approximately 1 to 2 milliseconds. The bandwidth required for the line of sight resolution is approximately 300 MHz, hence the figure of merit, the bandwidth-time product of the waveform needs to be approximately 300,000. In the illustrative embodiment, the natural waveform of the laser, i.e. a mode locked waveform, is used.

In radar, a long train of chirped pulses is used and the same has been tried with ladars. (See "*Pulse Compression of an FM Chirped $CO_2$*", published in Applied Optics, Vol. 28, No. 17, September 1989 by M. J. Halmos, D. M. Henderson and R. L. Duvall III.) However, the linearities required which are inversely proportional to the bandwidth-time product, have made this unreachable.

In U.S. patent application Ser. No. 10/099,705 filed Mar. 14, 2003 by M. J. Halmos entitled MODELOCKED WAVEFORM FOR SYNTHETIC APERTURE LADAR and U.S. patent application Ser. No. 10/020,730 filed Oct. 30, 2001 by M. J. Halmos entitled SYNTHETIC APERTURE LADAR SYSTEM USING INCOHERENT LASER PULSES, the teachings of both of which are hereby incorporated herein by reference, the possibilities of using a uniformed spaced set of pulses from a mode locked laser and also the use of an incoherent single pulse waveform were discussed.

Unfortunately, in certain applications, where the target range is very long, a single pulse is not practical due to the large amount of energy required. Such a pulse could cause optical damage. The solution would be to spread the energy into multiple pulses as with the mode lock waveform. One drawback of this waveform, as discussed in the above-referenced applications, is that the repeating pulses cause an inherent range ambiguity due to the repeating nature of the pulses.

A third approach commonly used in radar synthetic aperture is to use a linear. FM chirped waveform. As is known in the art, linear FM chirping is a frequency modulation scheme by which a carrier is modulated with plural frequencies sequentially indexed over a short time frame. For high resolution, the carrier must be chirped over a large frequency range.

However, this waveform is difficult to obtain due to the high time-bandwidth products required and the lack of high bandwidth optical modulators. Also, one would like to modulate a laser intra-cavity where a linear phase change is augmented to a linear frequency chirp (see U.S. Pat. No. 4,662,741, issued May 5, 1987 to R. L. Duvall III, M. J. Halmos, and D. M. Henderson entitled LINEAR FM CHIRP LASER and U.S. Pat. No. 4,666,295, issued May 19, 1987 to R. L. Duvall III, M. J. Halmos, D. M. Henderson entitled LINEAR FM CHIRP LASER II, the teachings of which are incorporated herein by reference). However, the maximum chirp that one can practically get is limited by the laser mode spacing $c/(2L)$ (where c=speed of light and L is the resonator optical length).

The present invention takes a mixed approach to utilize the advantages of the linear FM chirped and the mode locked waveforms. In accordance with an illustrative embodiment of the present teachings, the laser is intra-cavity chirped up to the limit mode spacing or free spectral range, typically a few hundred MHz, while simultaneously mode locking to create an unambiguous waveform that will have a bandwidth to multiple GHz.

FIG. 4 shows a block diagram of a laser 44 that will output a train of chirped mode locked pulses using mirror position modulation in accordance with an illustrative embodiment of the teachings of the present invention. A portion of the transmitted beam is sampled by the Phase and Frequency Offset Detector 68, which consists of the same hardware components as the Heterodyne Receiver in FIG. 3(*a*). The stored reference of the waveform of the Frequency Offset Detector 68 is fed to the Phase Corrector that corrects the phase and frequency deviations by performing a multiplication of the reference with the detected signal. As shown in FIG. 4, a pump source 84 provides energy to a gain medium 82, which constitutes the laser resonator. In the illustrative embodiment, the gain medium is conventional as is the pump source 84. A passive or active mode locking element 86 is disposed in optical alignment with the gain medium 82. In the best mode, the mode locking element is conventional in design. In accordance with the present teachings, the beam output by the gain medium 82 reflects off a translation laser scanning end mirror 90 driven by a piezo-electric drive 88. The piezo-electric drive 88 is controlled by the signal generator 49 and transmit controller 50 of FIG. 3(*b*). In the best mode, the piezo-electric drive is replaced with an electro-optical crystal inside the laser cavity. The crystal would be driven with a ramp to achieve a chirping of the carrier. A partially reflecting end mirror 92 serves to provide the laser output of 44 (A). The combination of the mode locking element and the translation end mirror yields an output pulse train that is mode locked and chirped. In the illustrative embodiment, chirping is achieved by scanning the resonator end mirror by one wavelength. The combined modulation of mode locking and linear FM chirping creates an unambiguous waveform using relatively proven methods of laser modulation that can be implemented in a compact transmitter. This signal is output to an optional amplifier 94.

The receiver shown in FIG. 3(*a*) consists of two channels, the in-phase and quadrature, I and Q, to distinguish between positive and negative frequencies. To achieve the quadrature signal, the local oscillator, LO, laser reference is delayed by quarter if a wavelength, $\pi/2$. The analog signals are digitized and recombined in memory. Each range bin is separated by the range demultiplexer, where a single return at a range bin would appear as shown in FIG. 6*a*, a chirped signal. The chirped signal is then convolved with a reference version of itself yielding the compressed signal shown in FIG. 6*b*. This detection step of the chirped waveform is the standard used in synthetic aperture radar for matched filter range transform.

Table 1 shows the list of some waveforms that may be considered for long range ladar imaging and some of the advantages and disadvantages of each. The simplest waveform to generate may be a single pulse (i.e. cavity-cavity dumped) with a pulse width short enough (i.e., bandwidth high enough) to obtain the range resolution desired. The waveform repetition rate samples the Doppler width due to the beam angular spread and must be set at twice the maximum frequency.

For most operations, a range of repetition rates from 8 kHz to 12 kHz would be required. For long ranges where high energy per shot is needed, the single pulse may not be possible due to potential damage considerations. In this case, the waveform may be stretched in time by either spreading the energy into various mode; locked pulses or a single cw (continuous wave) linear (or quasi-linear) FM chirp. The single pulse or mode locked burst may be most suitable for crystal lasers using intracavity modulation and the high bandwidth FM chirp may be most suitable for either short-cavity low power lasers and/or external modulation approaches.

However, optical frequency modulators with bandwidth of multi-GHz are rare to non-existent. Such devices exist in the telecom area in the wavelengths of 1.3 to 1.5 µm. However, to develop a modulator operable at other wavelengths, a significant development effort would be required.

In accordance with the present teachings, in order to obtain the laser coherence and bandwidth required for long range ladar imaging, a natural laser waveform of mode lock is used. Preferably, a passive or active mode locking modulation element is used running at the laser mode spacing frequency c/(2L), where 'c' is the speed of light and 'L' is the laser resonator optical length.

FIG. 5(a) and FIG. 5(b) show a correlation function of a train of mode locked pulses. The correlation function is the matched filter of the waveform, which is implemented by correlating the waveform to itself. FIG. 5(a) shows the transmitted waveform, and FIG. 5(b) shows the result of the self correlation. Without chirping, the correlation function shown in FIG. 5 has a range ambiguity $R_a$ given by: $R_a$= (2L)/c *c/2=L, the length of the resonator. High resolution is obtained by the fine comb of pulses, but one pulse is very similar to the next, creating a range ambiguity. The mode lock pulse bandwidth is only limited by the line width of the laser and this can be multiple gigahertz. By chirping just the mode spacing frequency of a few megahertz, one can break the ambiguous correlation and separate the individual pulse returns as shown in FIG. 6(a) and FIG. 6(b).

FIG. 6(a) and FIG. 6(b) show a correlation function of a train of mode locked pulses chirped in accordance with the teachings of the present invention. FIG. 6(a) shows the detected chirped waveform (as a result of a single return point) and FIG. 6(b) shows the result of the self correlation. The chirping breaks the range ambiguity allowing a receiver to select individual pulses and determine the centroid of the waveform. In the illustrative embodiment, the chirping of the beam is achieved by scanning the position of one of the laser end mirrors 90 or 92 by a distance equaling the optical wavelength.

Another way to achieve the chirping is disclosed in "*Pulse Compression of an FM Chirped $CO_2$*", published in Applied Optics, Vol. 28, No. 17, September 1989 by M. J. Halmos, D. M. Henderson and R. L. Duvall III, by inserting a phase modulator in the laser resonator and effectively changing the optical length of the resonator by a wavelength (usually 1 to 2 microns). Thus, those skilled in the art will appreciate that the present teachings are not limited to the means by which the beam is chirped.

Thus, the present invention has been described herein with reference to a particular embodiment for a particular application. Those having ordinary skill in the art and access to the present teachings will recognize additional modifications applications and embodiments within the scope thereof. For example, the present teachings are not:limited to ladar. That is, the present teachings may be utilized for other applications without departing from the scope thereof.

It is therefore intended by the appended claims to cover any and all such applications, modifications and embodiments within the scope of the present invention.

Accordingly,

What is claimed is:

1. A ladar system comprising:

first means for generating a chirped mode-locked laser beam;

second means for recording phase and frequency information pertaining to said laser beam and subsequently transmitting said laser beam from said system in response thereto;

third means for receiving a reflected version of said laser beam and providing a received signal in response thereto, said third means including an In-phase (I) and Quadrature (Q) receiver for implementing I and Q detection and outputting said received signal having I and Q electrical signal components in response thereto; and fourth means for correcting said received signal based on said phase and frequency information recorded by said second means.

2. A ladar method comprising the steps of:

generating a chirped mode-locked laser beam;

recording phase and frequency information pertaining to said laser beam and subsequently transmitting said laser beam from said system in response thereto;

receiving a reflected version of said laser beam and providing a received signal in response thereto, said third means including an In-phase (I) and Quadrature (Q) receiver for implementing I and Q detection and outputting said received signal having I and Q electrical signal components in response thereto; and correcting said received signal based on said recorded phase and frequency information.

* * * * *